Sept. 3, 1957          J. P. SMITH          2,805,413
GROUND CLUTTER REDUCTION IN COHERENT PULSE RADAR SYSTEM
Filed Sept. 20, 1947          2 Sheets-Sheet 2
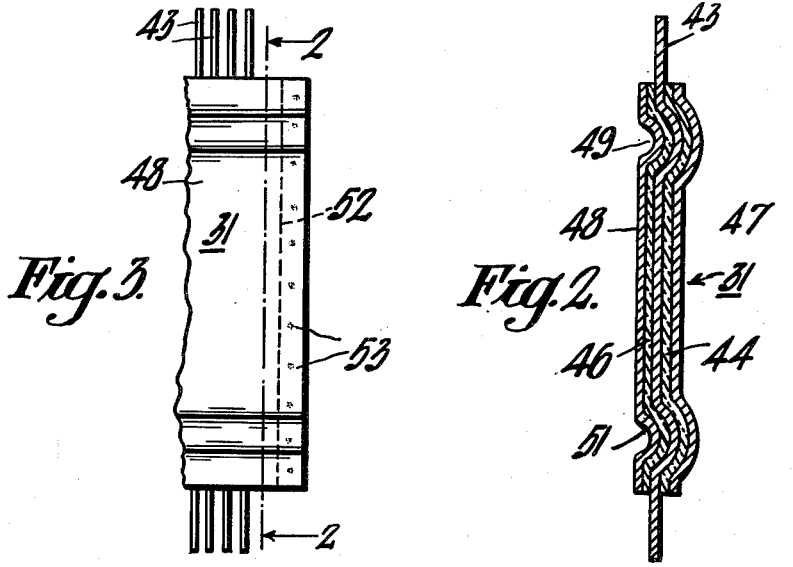
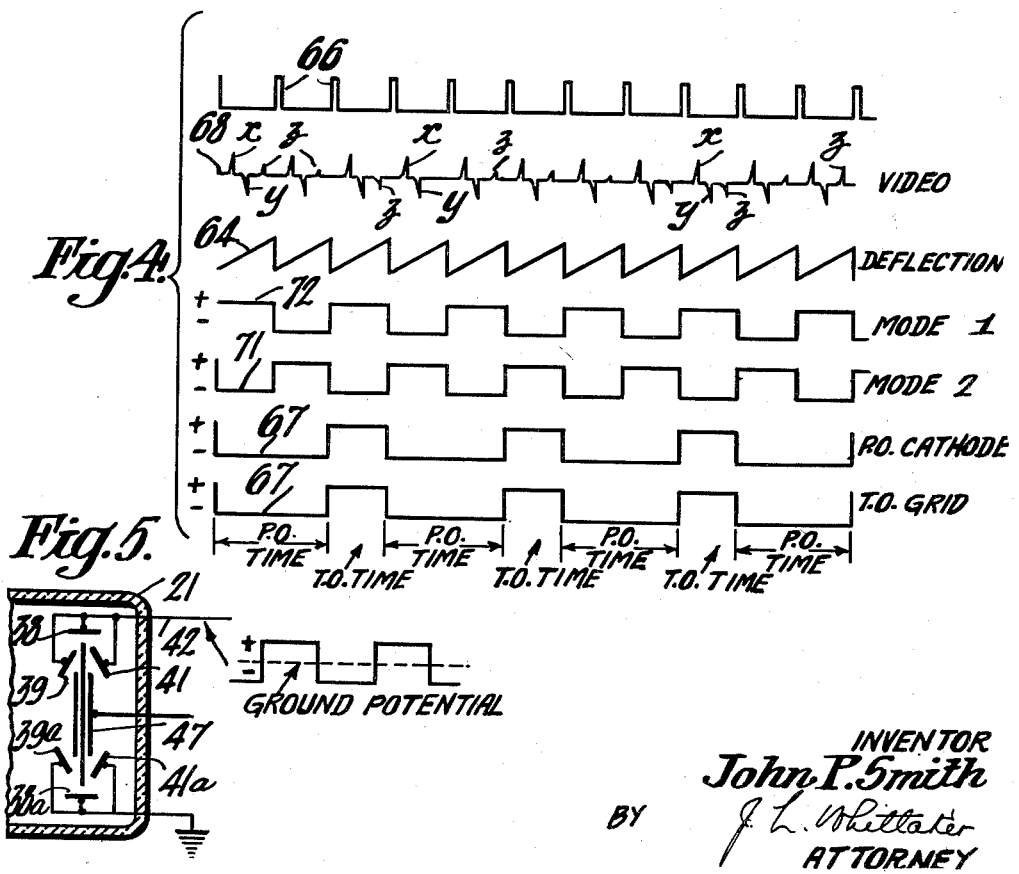
INVENTOR
John P. Smith
BY
ATTORNEY

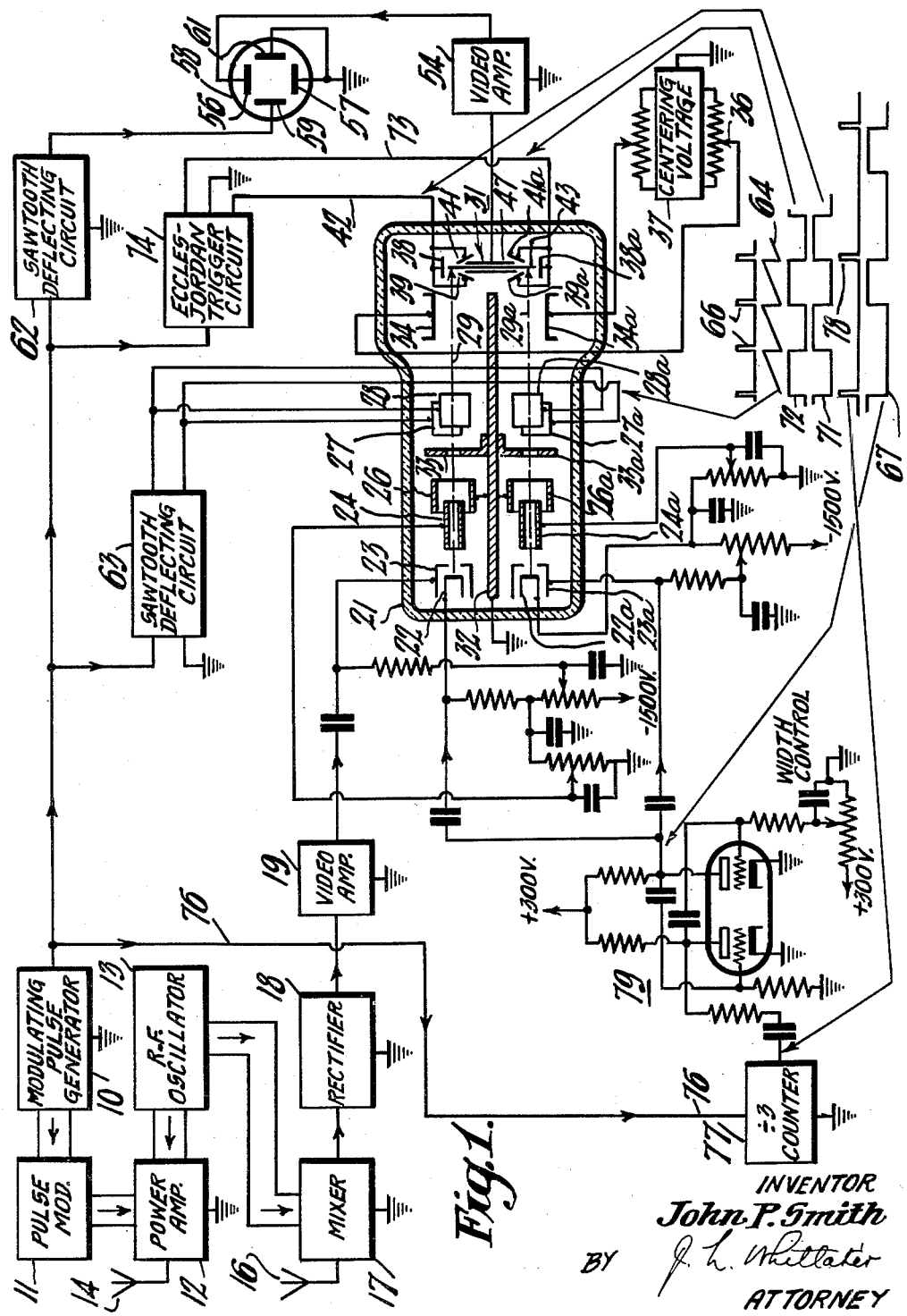

United States Patent Office 2,805,413
Patented Sept. 3, 1957

2,805,413

GROUND CLUTTER REDUCTION IN COHERENT PULSE RADAR SYSTEM

John P. Smith, Cranbury, N. J., assignor, by mesne assignments, to the United States of America as represented by the Secretary of the Army Application September 20, 1947, Serial No. 775,260

5 Claims. (Cl. 343—7.7)

My invention relates to pulse-echo distance finding or locating systems and particularly to systems wherein indications of moving targets may be viewed to the exclusion of indications of stationary targets.

The invention is applied to the so-called coherent pulse radar system which distinguishes rapidly between moving and stationary targets. The output of the coherent pulse receiver comprises pulses of fixed amplitude which correspond to stationary targets and pulses of varying amplitude which correspond to moving targets.

An object of the present invention is to provide in a radar system an improved method of and means for presenting to an observer only the indications representing moving targets to the exclusion of indications representing stationary targets.

A further object of the invention is to provide in a coherent pulse radar system an improved method of and means for cancelling out fixed target pulses or indications and supplying only moving target pulses or indications to an indicator.

In practicing the invention according to a preferred embodiment the output signals of the coherent pulse receiver are applied to an input electrode of a storage tube which preferably is of the type described and claimed in application Serial No. 588,047, filed April 12, 1945, in the name of Richard L. Snyder, Jr. and entitled Target and Circuit for Storage Tubes, now Patent No. 2,618,763. The desired fixed target pulse cancellation is obtained by applying switching pulses to collector electrodes in the storage tube for operating the tube alternately in two modes of operation.

The invention will be better understood from the following description taken in connection with the accompanying drawing in which—

Fig. 1 is a block and circuit diagram of a pulse-echo radar system embodying the invention, Fig. 2 is a view in cross section of the storage screen employed in the storage tube shown in the circuit of Fig. 1, Fig. 3 is a fragmentary plan view of the storage screen shown in Fig. 2, Fig. 4 is a group of graphs that are referred to in explaining the invention, and Fig. 5 is a fragmentary view illustrating a modification of the circuit shown in Fig. 1.

In the several figures similar parts and similar graphs are indicated by similar reference characters.

Referring to Fig. 1, there is shown, by way of example, a simple type of coherent pulse radar system which comprises a pulse generator 10 that supplies electrical pulses at the desired repetition rate to a pulse modulator 11 which pulse modulates a power amplifier 12. The power amplifier 12 is supplied with carrier signal from an R.-F. oscillator 13. It may be assumed for example, that the pulse repetition rate is 900 pulses per second.

The pulses of R.-F. carrier signal are radiated from a transmitting antenna 14 and after reflection are picked up by a receiving antenna 16. The received pulses are supplied to a mixer 17 where they are mixed with carrier wave signal supplied from the continuously oscillating R.-F. oscillator 13. The mixer may be of the kind used in superheterodyne receivers and should have a square law characteristic. The mixer output signal is rectified by a rectifier 18 so that there is obtained an output comprising pulses of fixed amplitude which represent fixed targets and pulses of varying amplitude which represent moving targets. These pulses are preferably amplified by a video frequency amplifier 19 before being applied to a storage tube 21 for affecting cancellation of fixed target pulses.

The coherent pulse system so far described is only one of several forms. In practice other more complicated forms are preferred. Some of these forms are described in Radar System Engineering, by Ridenour, vol. 1, chapter 16.

The storage tube 21 will now be described briefly. The tube 21 is described in detail in the above-mentioned Snyder application.

The tube 21 is a double-gun tube, one of the guns producing a signal put-on electron beam and the other gun producing a signal take-off electron beam. The electron gun in the put-on section of the tube 21 comprises an indirectly heated cathode 22, a control electrode 23, a first anode 24 and a second anode 26. Deflecting plates 27 and 28 are provided for deflecting the electron put-on beam 29 across one end of a storage screen 31 described hereinafter.

A grounded metallic plate 32 divides the two sections of the tube 21 and acts as a shield and electrode support. An aperture shield plate 33 is positioned between the anode 26 and the deflecting plates 27 and 28.

Vertical centering of the beam 29 is accomplished by means of a deflecting plate 34 and the portion of shield 32 below it which acts as the other deflecting plate. Centering voltage is applied to the plate 34 from a tap 36 supplied with voltage from a source 37.

Electron collector plates 38, 39 and 41 are provided adjacent to the open wire elements of the storage screen, the screen construction being described later in connection with Figs. 2 and 3. The collector plates 38, 39, and 41 are connected together so that a mode switching voltage may be applied thereto by way of a lead 42.

The gun electrodes and other tube elements in the take-off section of tube 21 are the same as in the put-on section just described and are indicated by like reference numerals with the suffix "a" added.

The construction of the storage screen 31 is shown in Figs. 2 and 3 of the drawing. Referring to Figs. 2 and 3, a series of conducting wires 43 are stretched taut and accurately spaced apart between two insulation sheets 44 and 46 of some material such as mica. Two metal plates 47 and 48 are placed on opposite sides of the mica sheets, as shown, and pressed firmly together in suitable dies so as to be deformed with transverse channels 49 and 51, so as to hold the wires and sheets firmly in position, as well as to give the assembled unit the desired rigidity. The metal plates 47 and 48 are indicated as being of rectangular shape and extend sufficiently beyond the side of the mica sheets (shown in dotted line at 52) so that the two plates can be welded together, for example by spot or line welding, as at 53, to hold the parts rigidly together.

Figure 3 is broken away to reduce the size of the figure, but it will be understood that the left-hand part of the figure, not shown, will be similar to that illustrated in the figure and that the target will be of sufficient width to accommodate the desired number of conducting wires 42, which, for example, may be fifty per inch.

Before describing the additional circuit of the system, the theory of operation of the storage tube as used in the present invention will be explained. Video frequency signals are applied to the storage tube without any polarity switching at the tube input circuit and the collector plate potentials are switched to change the mode of operation of the storage tube.

In one mode of operation, the put-on collector plates 38, 39, 41 are made positive with respect to ground and the take-off collector plates 38a, 39a, 41a are made negative or put at ground potential. The put-on beam 29 knocks off secondary electrons from the target wires 43, according to the beam intensity, which are collected by the positive collector plates 38, 39, 41. Target wires struck by the beam are therefore charged positively. The take-off beam 29a replaces the electrons knocked off bringing the wires to equilibrium potential. A negative output signal is produced.

In the other mode of operation, the put-on collector plates 38, 39, 41 are put at ground potential or are made negative with respect to ground and the take-off collector plates 38a, 39a, and 41a are made positive. The put-on beam 29 knocks off secondary electrons, which return to the same point on the target plus some more electrons from the beam, which pile up on the target wires 43 charging the wires negatively. The take-off beam 29a knocks off secondary electrons and they go to the positive take-off collector plates 38a, 39a and 41a, bringing the wires 43 back to equilibrium potential. A positive output signal is produced.

Referring again to the circuit of Fig. 1, the video signal output of amplifier 19 is applied to the control electrode 23 of the put-on gun. The stored signal is taken off the signal plate 47, amplified by a video frequency amplifier 54, and applied to the vertical deflecting plates 56 and 57 of a cathode ray indicator tube 58. A time axis sweep for the tube 58 is obtained by applying sawtooth waves to the horizontal deflecting plates 59 and 61 from a sawtooth wave generator 62. The generator 62 produces sawtooth waves in synchronism with the modulating pulses applied from the generator 10, each pulse producing one sawtooth.

The put-on beam 29 and the take-off beam 29a are deflected across the target wires 43 by means of a sawtooth wave deflecting circuit 63 which produces the sawtooth waves 64 in synchronism with the modulating pulses 66 as shown by the graphs in Figs. 1 and 4.

The cycle of operation is as follows. The put-on beam 29 is swept across the target wires 43, first with the collector plates connected to give one mode of operation and next with them connected to give the other mode of operation. This results in the cancellation of any charges on the target wires 43 due to stationary target, but charges due to moving targets will not be cancelled out. During these two put-on sweeps the take-off beam 29a is blocked or cut off by the application of a blanking pulse 67 (Figs. 1 and 4) to the control electrode 23a.

Following the two put-on sweeps, the take-off beam 29a is unblocked and the put-on beam 29 is blocked by applying the blanking wave 67 to the cathode 22 of the put-on gun. Thus, during the third sweep the sweeping of the beam 29a across the target wires 43 results in a signal at the signal plate 47 that is representative of moving targets, and of moving targets only.

The foregoing cycle of operation is illustrated by the graphs in Fig. 4 where 66 represents the transmitter modulating pulses and where the graph 68 represents the video frequency output of the amplifier 19. In graph 68 the pulses $x$ and $y$ are caused by stationary targets while the pulse $z$ is caused by a moving target. It will be seen that the moving target pulse $z$ changes in amplitude and polarity while the pulses $x$ and $y$ are of fixed amplitude and polarity.

As indicated at the bottom of Fig. 4, the first two sweeps of the sawtooth wave 64 occur during the put-on or P. O. time and the next sweep occurs during the take-off or T. O. time. The mode switching is accomplished by applying the rectangular voltage waves 71 and 72 to the put-on and take-off collector plates, respectively, by way of leads 42 and 73, respectively. The mode switching pulses 71 and 72 are supplied from an Eccles-Jordan trigger circuit 74 that is triggered by the positive pulses 66 from the pulse generator 10. An E-J trigger circuit of this type is well known and is described, for example, in Radar Electronic Fundamentals, dated June 29, 1944, pages 192 to 194, and published by the War Department as TM11–466.

The blanking pulses 67 are generated by applying pulses 66 from pulse generator 10 over a lead 76 to a 3 to 1 frequency divider 77 which may be of the well known counter and blocking oscillator combination. The output of counter 77 is represented by the graph 78 (Fig. 1). The pulses 78 are applied to a multivibrator 79 of conventional design which produces the blanking pulses 67. The relative widths of the positive and negative pulses of the wave 67 are adjustable by varying the multivibrator grid bias as indicated on the drawing.

Figure 5 illustrates a modification of the circuit shown in Fig. 1. In the arrangement of Fig. 5 the take-off collector plates 38a, 39a and 41a are held at a constant potential such as ground while the put-on collector plates are switched to a potential above said constant potential and then to a potential below said constant potential. Thus the storage tube is operated successively in the two modes of operation during the two put-on sweeps.

The difference in the results obtained by the circuits of Figs. 1 and 5 is that in Fig. 1 the switching at the take-off collector plates 38a, 39a and 41a results in a rectifying or polarity reversing action so that the output pulses due to a moving target are unchanging in polarity. In Fig. 5, on the other hand, the output pulses due to a moving target will vary in amplitude and polarity the same as the video frequency input pulses $z$ illustrated in Fig. 4. The circuit of Fig. 1 may be preferred, for example, where the storage tube output signal is applied to an indicator of the well known P. P. I. type.

Where found in the claims the expression "system of the coherent pulse type" means a system wherein the carrier wave frequency of reflected radio pulses is compared with a local oscillation source of fixed phase with respect to the carrier wave frequency of the transmitted pulses whereby a Doppler frequency effect is obtained if the reflecting target is moving.

It should be understood that the present invention is not limited to the use of a storage tube having the specific storage screen construction that is illustrated. For example, the storage screen may comprise a ruled line structure such as disclosed in application Serial No. 492,658 filed June 26, 1943, in the names of Harley Iams, Albert Rose and Gardner L. Krieger and entitled Cathode Ray Storage Tube, now Patent No. 2,454,652.

While three collector plates or plate elements are shown in the drawing at each end of the storage screen, it may be desirable to simplify the construction and omit the collector plate element at the back of the screen, particularly if the screen construction of the above-mentioned Iams et al. application is used. In some screen constructions a single collector plate element at each end of the storage screen may be sufficient. The important feature is that the tube construction be such that the tube may be operated in the two different modes.

I claim as my invention:

1. In combination a pulse-echo radio locator system of the coherent pulse type which in operation has a video frequency receiver output comprising electrical pulses of substantially constant amplitude and of constant polarity which are representative of stationary targets and comprising electrical pulses of varying amplitude and changing polarity which are representative of moving targets, a double-gun storage tube having a storage screen having a plurality of storage elements extending from one end of said screen to its other end and having a signal output plate in capacity relation to said storage elements, and comprising an electron gun for producing a put-on electron beam and directing it against the storage elements at one end of said screen and further comprising a second electron gun for producing a take-off electron beam and directing it against the storage elements at the other end of said screen, at least one collector plate being positioned adjacent to each of said storage screen, one collector plate collecting secondary electrons released from the storage elements by the put-on beam and another collector plate collecting secondary electrons released from the storage elements by the take-off beam, means for applying said video frequency output to said put-on electron gun to modulate said put-on beam, means for deflecting said put-on beam across said storage elements twice in succession in response to the transmission of two successive pulses and during the time that echo pulses may be received, means for maintaining said put-on beam collector plate first positive and then negative with respect to the take-off beam collector plate during said two successive deflections, respectively, of the put-on beam, means for blocking the take-off beam during said two successive deflections of the put-on beam, means for deflecting the take-off beam across said storage elements following said two successive deflections of the put-on beam whereby signal appears on the signal output plate, and means for blocking the put-on beam during said deflection of the take-off beam, a utilization circuit, and means for supplying signal from the signal output plate to the utilization circuit.

2. The invention according to claim 1 wherein said storage screen comprises storage elements consisting of a multiplicity of spaced parallel conductors and insulating means for clamping said conductors in rigid position for a major portion of their length.

3. In combination a pulse-echo radio locator system of the coherent pulse type which in operation has a video frequency receiver output comprising electrical pulses of substantially constant amplitude and of constant polarity which are representative of stationary targets and comprising electrical pulses of varying amplitude and changing polarity which are representative of moving targets, a double-gun storage tube having a storage screen having a plurality of electrically conducting storage elements extending from one end of said screen to its other end and having a signal output plate in capacity relation to said storage elements, and comprising an electron gun for producing a put-on electron beam and directing it against the storage elements at one end of said screen and further comprising a second electron gun for producing a take-off electron beam and directing it against the storage elements at the other end of said screen, at least one collector plate being positioned adjacent to each end of said storage screen, one collector plate collecting secondary electrons released from the storage elements by the put-on beam and another collector plate collecting secondary electrons released from the storage elements by the take-off beam, means for applying said video frequency output to said put-on electron gun to modulate said put-on beam, means for deflecting said put-on beam and said take-off beam across said storage elements in response to each pulse transmission and during the time that echo pulses may be received, means for maintaining said put-on beam collector plate first positive and then negative with respect to the take-off beam collector plate during two successive deflections of the put-on beam, means for blocking the take-off beam during said two successive deflections of the put-on beam and for blocking the put-on beam during the next succeeding deflection of the take-off beam, a utlization circuit, and means for supplying signal from the signal output plate to the utilization circuit during said last-mentioned deflection of the take-off beam.

4. In combination, a double-gun storage tube having a storage screen having a plurality of storage elements extending from one end of said screen to its other end and having a signal output plate in capacity relation to said storage elements, and comprising an electron gun for producing a put-on electron beam and directing it against the storage elements at one end of said screen and further comprising a second electron gun for producing a take-off electron beam and directing it against the storage elements at the other end of said screen, at least one collector plate being positioned adjacent to each end of said storage screen, one collector plate collecting secondary electrons released from the storage elements by the put-on beam and another collector plate collecting secondary electrons released from the storage elements by the take-off beam, means for deflecting said put-on beam across said storage elements during a first signal period and during a second signal period, means for modulating said put-on beam during said two signal periods with signals that are alike during said two periods and with signals that are unlike during said two periods, means for maintaining said put-on beam collector plate first positive and then negative with respect to the take-off beam collector plate during said two successive deflections, respectively, of the put-on beam, means for blocking the take-off beam during said two successive deflections of the put-on beam, means for deflecting the take-off beam across said storage elements following said two successive deflections of the put-on beam whereby signal appears on the signal output plate, and means for blocking the put-on beam during said deflection of the take-off beam, a utilization circuit, and means for supplying signal from the signal output plate to the utilization circuit.

5. In combination a pulse-echo radio locator system of the coherent pulse type which in operation has a video frequency receiver output comprising electrical pulses of substantially constant amplitude and of constant polarity which are representative of stationary targets and comprising electrical pulses of varying amplitude and changing polarity which are representative of moving targets, a storage tube having a storage screen having a plurality of storage elements extending from one end of said screen to its other end and having a signal output plate in capacity relation to said storage elements, and comprising an electron gun for producing an electron beam and directing it against the storage elements at one end of said screen, at least one collector plate being positioned adjacent to each end of said storage screen, one collector plate collecting secondary electrons released from the storage elements by said electron beam, means for deflecting said electron beam across said storage elements twice in succession in response to the transmission of two successive pulses and during the time that echo pulses may be received, means for applying said video frequency output to said electron gun to modulate said electron beam during said two successive deflections, means for maintaining said one collector plate first positive and then negative with respect to the other plate during said two successive deflections, respectively, of the electron beam, means for deflecting an electron beam across said storage elements following said two successive deflections whereby signal appears on the signal output plate, a ultilization circuit, and means for supplying signal from the signal output plate to the utilization circuit.

References Cited in the file of this patent
UNITED STATES PATENTS 2,422,135 Sanders June 10, 1947
2,430,038 Wertz Nov. 14, 1947